Aug. 18, 1936.   F. A. GAUGER   2,051,294
AUTOMATIC VALVE
Filed Oct. 8, 1934

INVENTOR.
Frank A. Gauger
BY
Arthur R. Woodford
ATTORNEY.

Patented Aug. 18, 1936

2,051,294

UNITED STATES PATENT OFFICE 2,051,294

AUTOMATIC VALVE

Frank A. Gauger, Milwaukee, Wis.

Application October 8, 1934, Serial No. 747,368

13 Claims. (Cl. 236—84)

This invention relates to an automatic valve, such, for instance, as a gas valve, for use in controlling the main burner of a furnace, heater, or other device of this type.

Objects of this invention are to provide a novel form of relay control diaphragm valve which is so constructed that it may be made in a small or a large size, although it is controlled by a relatively small low voltage relay, which may therefore be controlled from a room thermostat, for instance, and in which any desired speed of opening or closing may be attained by the correct proportioning of certain parts of the device, in which the diaphragm valve has normally balanced pressure on its upper and lower side when in closed position, in which the valve is biased towards closed position, thereby providing an unbalanced valve, in which the opening may be made sufficiently slow to prevent a sudden rush and explosive like action at the burner, but sufficiently fast to prevent a flashback, and which is so made that if the current should fail, or if the diaphragm should leak, the valve will automatically close and no damage will result.

Further objects are to provide a relay control diaphragm valve which may be regarded as a floating valve, which may be controlled by an automatic regulator such as a thermostat or pressure responsive member or float, or any other regulator, in addition to the control afforded by the control relay, so that the valve substantially floats and will maintain a given temperature, pressure, or height of liquid for which the automatic regulator is set without requiring opening and closing of the relay, the valve merely positioning itself automatically in proportion to the temperature pressure or other condition for which the automatic regulator is set.

In greater detail, this invention provides a diaphragm valve which may be automatically either thermostatically or manually controlled by a small electric relay, and in addition in which an automatic regulator, for instance a thermostat, may be set for a given temperature and placed, for example, in the hood of a furnace, and to so relate the several elements of the apparatus that the automatic regulator will cause the valve to adjust itself and maintain a predetermined temperature without requiring fluctuations above and below the temperature, due to complete opening and complete closing of the valve, as has heretofore been necessitated by the usual type of automatic temperature control for furnaces and other devices.

Further objects are to provide a construction of relay control diaphragm valve which is so made that the automatic regulator may be rendered inoperative if desired or may be completely removed without disturbing the relay control of the diaphragm valve.

Further objects are to provide a manual control directly at the valve so that in the event of failure of current, the device may nevertheless be caused to function by manually moving the manual control, and in which the manual control snaps back to its initial inoperative position as soon as the current comes on.

Further objects are to provide an automatic valve having the features hereinabove enumerated, but which nevertheless is of simple design, which is free from delicate or easily damaged parts, and which may be assembled with the utmost ease.

Further objects are to provide an automatic diaphragm valve having the features enumerated above, but which nevertheless may be operated solely from the automatic control device without requiring the functioning of the electric relay. In this manner of using the device, no wiring is run to the electric relay and the manual control is moved to a position to set the device for operation, the automatic control device assuming full control of the diaphragm valve thereafter. In the event it becomes desirable to have the valve permanently closed, the manual control is then set to its "off" position and all further functioning of the diaphragm valve ceases.

Further objects are to provide a construction as outlined above, in which the regulator may be rendered wholly inoperative and the diaphragm valve may thereafter be controlled solely by the electric relay or by the manual means.

An embodiment of the invention is shown in the accompanying drawing, in which:—

Figure 1:
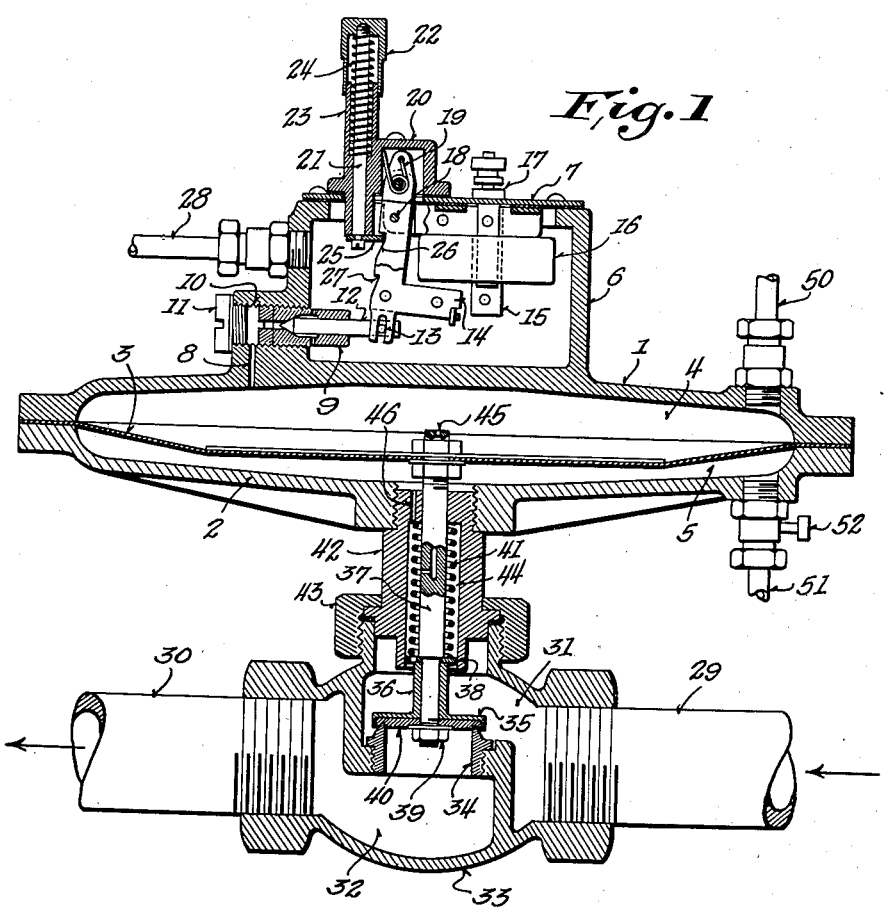
Figure 1 is a vertical sectional view through the device.

Referring to the drawing, it will be seen that the automatic diaphragm valve comprises a casing having upper and lower portions 1 and 2 between which a diaphragm 3 is clamped, thus dividing the casing into an upper compartment 4 and a lower compartment 5.

The upper portion 1 of the casing is continued upwardly to form an auxiliary housing 6 provided with a cover 7.

The interior of the auxiliary housing communicates with the upper chamber 4 of the casing by means of a small passageway or bleed 8. This passageway 8 communicates with the passageway through the valve body portion 9, such valve portion being screwed into the threaded aperture 10. A closure plug 11 closes the outer end of the aperture 10, as is apparent from Figure 1.

The movable portion of the valve comprises a needle plunger valve 12 provided with small trunnions or pins 13 which are operated by a slotted arm carried by the armature 14 of an electric relay. The stationary core of the relay is indicated by the reference character 15 and the energizing coil by the reference character 16. The terminals of the coil are connected to the binding posts 17. The armature is pivoted, as indicated at 18, and a spring 19 is provided and is mounted within the hollow portion of a small fitting 20 secured to the cover 7. The armature 14 may, if desired, be provided with a shading coil, as shown in Figure 1.

The fitting 20 forms a guide for a manually manipulable plunger 21 which is screwed into an upper thumb piece 22 which latter telescopically slides over a tubular extension 23 formed integrally with the fitting 20. A spring 24 is provided which urges the plunger upwardly.

The plunger has a roughly semi-circular disk 25 clamped to its lower end and forming a stop for the upward travel of the plunger. This disk is adapted when the plunger is depressed to ride over the bevelled portion 26 formed on the outer side of the armature and to lock beneath the shoulder 27 formed on such face of the armature, thereby urging the armature inwardly towards relay closed position and opening the valve, the portion 25 being locked beneath the shoulder 27 and holding the plunger in place.

Thus the relief valve for the relief bleed 8 may be opened by means of the manually depressible member 22, but it is to be noted further that when current is furnished the relay, that the armature is drawn inwardly and the manually operable member is thus released and snaps back to its initial position. Normally the device will be operated directly from the relay without the use of the manual member. When the relay is energized, the valve 12 is drawn to its open position and when the relay is deenergized, the valve is moved backwardly to closed position. The fluid, such as gas, for instance, collecting in the casing 6 is discharged by means of the discharge pipe 28 to any suitable point, for instance adjacent the main burner, if the device is applied to the control of a gas burner.

The main valve controls the flow of pressure fluid from the inlet portion 29 to the outlet portion 30, through the inlet duct 31 and the outlet duct 32 of the body portion 33 of the valve. This body portion is provided with a removable valve seat 34 against which the movable valve member 35 is adapted to seat. This valve member may be provided with a gasket, as shown, or may be formed in any suitable manner. It is obvious that the diaphragm 3 may be made in any size desired for either a large main valve or a small main valve, the diaphragm itself being controlled by the electric relay or by the manual means hereinbefore described.

A convenient way of forming the valve is to provide the valve member 35 with a sleeve 36 which may be integral therewith if desired, and to provide a shouldered valve stem 37, a small washer or similar member 38 being clamped between the sleeve 36 and the shouldered portion of the stem 37 by means of a nut 39 screw threaded onto the lower end of the reduced portion of the valve stem. This stem means may be employed to hold the gasket 40 of the movable valve member in place.

The washer 38 is apertured at one or more places, as indicated in Figure 1, and a helical spring 41 loosely surrounds the valve stem and bears at its upper end against the upper portion of the fitting 42 through which the valve stem slides. This fitting 42 is clamped by means, for instance, of a union coupling member 43 to the body portion 33 of the valve, a suitable gasket being preferably provided, as indicated.

The pressure fluid, for instance gas, passes into the space 44 around the valve stem and within the fitting 42 and passes upwardly through a small restricted bleed 45 formed in the valve stem into the upper compartment 4 of the casing. Further, it is to be noted that the fitting 42 is provided with a small restricted bleed 46 leading to the lower compartment of the casing. Thus the upper and lower compartments of the casing are provided with pressure fluid supplied from the inlet duct of the main valve body, and when the relay control valve has closed, the pressure on the upper and lower side of the diaphragm is equalized. However, the main valve is biased towards closed position by means of the spring 41 and consequently the valve will close under these conditions.

It is to be particularly noted that this construction provides restricted supply bleeds for the upper and lower compartments of the casing, as indicated by the reference characters 45 and 46, and a restricted outlet bleed or relief bleed for the upper compartment of the casing.

This construction, as will become apparent as the description proceeds, lends itself well to an automatic control of the valve to secure a floating action of the valve, that is to say, a graduated motion of the movable valve member in proportion to the setting of the automatic regulator.

This automatic regulator may be a thermostat or pressure responsive member or a float, as is obvious. One type of member has been shown, for instance a thermostat, as may be seen from Figure 2. This thermostat may be a conventional design and provided with the temperature responsive portion 47, which may be positioned in the bonnet or hood of a furnace, or any other place where temperature is to be controlled.

The body portion of the thermostat, indicated by the reference character 48, is provided with a manually set dial 49 in the usual way. This automatic regulator controls communication between the pipes 50 and 51 which lead to the upper and lower compartments of the diaphragm casing. The thermostat is of conventional construction well known in the art and has not been illustrated in detail. It is to be borne in mind, however, that any other form of automatic regulator may be provided, as previously stated.

Figure 2:
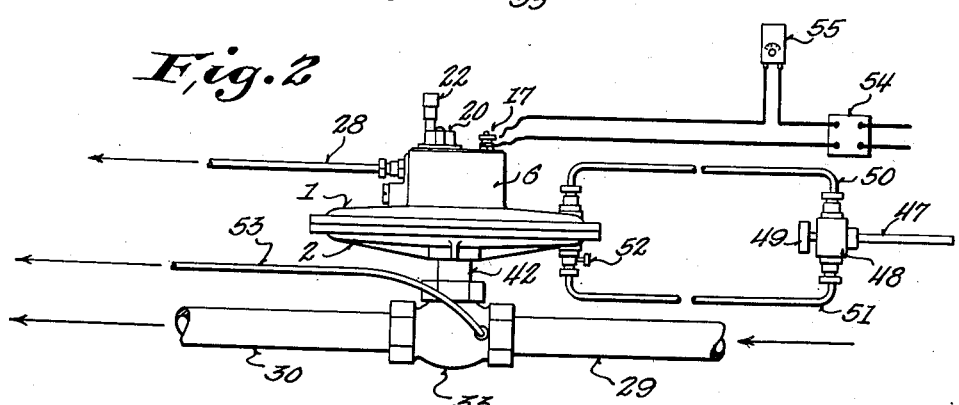
Figure 2 is a side elevation to a smaller scale showing the device and the associated system.

Considering Figure 2, it is apparent that the pipes 50 and 51 form a by pass passageway between the upper and lower compartments and that the automatic regulator controls this by pass between such compartments.

If desired, a cut off valve 52 may be provided in one of the pipes, for instance the pipe 51, to render the automatic regulator inoperative should this condition be desired. It is to be noted also that the valve 52 controls the restricted automatic by-pass means for by-passing fluid from one compartment to the other compartment. If this valve 52 is cut off completely, it precludes any by-passing and the amount of opening of this valve controls the amount by-passed. If desired, a pilot supply pipe 53 may be provided, as shown in Figure 2.

Figure 3:
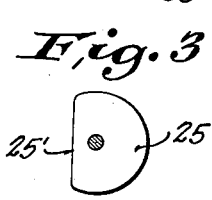
Figure 3 is a view of the bottom portion of the manual control, partly in section.

Further, it is to be noted from Figure 3 that the locking disk 25 of the manually controlled member is provided with a cut away or flat face 25' so that if this manually controlled member is rotated, it may be manually released even after the disk has been latched beneath the shoulder 27, for obviously when the flat face is turned towards such shouldered portion, the disk 25 is moved out of engagement with the shouldered portion.

From the description thus far given it is apparent that when the pressure is equalized between the upper and lower compartments 4 and 5 of the diaphragm casing, that the valve will close due to the fact that it is biased towards closed position. However, when the relay control valve is opened, either through the instrumentality of the relay or of the manual means, the pressure in the upper compartment 4 drops and the pressure in the lower compartment 5 is then effective to raise the valve against the action of the spring or other biasing means. The valve may move to fully open position under these conditions. However, when the automatic regulator is provided, it is obvious that so long as the valve of the relay is opened, that a floating action of the main valve can occur, for this automatic regulator by passes varying amounts of pressure fluid, for instance gas, from the lower compartment 5 to the upper compartment and thus controls the position of the main valve by varying the forces acting on the diaphragm.

A truly floating action is obtained in actual tests with this device. For example, assume that the automatic regulator is a thermostat and mounted in the hood of a furnace, and that the relief valve 12 controlled by the relay is open. Obviously gas is supplied the main burner of the furnace and as the temperature rises, the automatic regulator or thermostat 48 adjusts itself to vary the communication between the lower and upper compartments of the diaphragm casing through the by pass pipes 51 and 50. This regulator does not instantly close the valve. Instead, it causes the main valve to float as the pressure acting on the diaphragm is exactly proportioned to the gradual changing position of the thermostat or automatic regulator.

The relay may be supplied from a small step down transformer, such as a bell ringing transformer indicated by the reference character 54 and may be controlled from a room thermostat 55, for example.

From the description it is apparent that when the room thermostat calls for an increase in temperature, the main valve is opened and remains fully opened until the thermostat takes control and varies the pressure acting on the diaphragm thus causing the main valve to float to its exact position to maintain the temperature for which the automatic regulator is set.

This action is obtained due to the fact that there is a restricted supply bleed leading to the lower compartment and a restricted supply bleed leading to the upper compartment of the diaphragm casing, as well as a restricted discharge bleed leading from the upper compartment.

It is obvious that even with the discharge or relief bleed opened, that if the thermostat or other automatic regulator fully opens the by pass passageway between the lower and upper compartments, that equalization of pressure on the upper and lower side of the diaphragm will occur and consequently the valve will seat.

However, for lesser openings of the automatic regulator or thermostat 48 a proportionate difference in pressure exists on opposite sides of the diaphragm and consequently the main valve will float to the exact position desired and called for by the setting of the automatic regulator or thermostat 48.

It is obvious that the device can be controlled solely from the small low voltage relay without the intervention of the automatic regulator, if desired. Under these conditions, the valve 52, see Figure 2, is closed, thus rendering the automatic regulator inoperative. Thereafter the opening and closing of the main valve corresponds identically to the opening and closing of the relay control relief bleed valve 12.

If current should fail and it is desired to operate the device manually, obviously all that is needed is to press the member 22 downwardly, thus opening the relief bleed valve 12. If thereafter current comes on, the armature of the relay is drawn inwardly and the manual member is released and snaps back into its initial position.

If for any reason during the automatic operation of the device current should fail, the valve will close due to the fact that the relay valve is closed and pressure then becomes equal on the upper and lower sides of the diaphragm, the biasing spring then closing the valve.

With a furnace burner controlled by a valve as hereinabove described, it is apparent that overshooting of the temperature cannot occur and the temperature does not fluctuate above and below the desired point, but instead the temperature gradually comes up to the desired point and is held at this point by the floating action of the main valve under the control of the automatic regulator.

A further and important function that is performed by the adjustable valve 52 is as follows: This valve may be adjusted to a nearly closed position to permanently restrict the by pass passageway through the pipes 51 and 50. Under these conditions the operation of the apparatus is as follows:

If the automatic regulator 48 should fully open, nevertheless the main valve will still float a slight distance away from its seat so as to maintain a minimum flame for the main burner controlled by the main valve. In other words, the adjustment of the valve 52 may be such that the temporary overshooting of the thermostat will not produce complete closing of the main valve and consequently complete extinction of the main burner controlled by the main valve. The restricted by pass, when the valve 52 is set towards closed position, is such that a sufficient length of time is allowed the regulator or thermostat 48 to adapt itself to the normal temperature for which it is set and to correspondingly adjust the main valve.

Additionally, it is apparent that if the main valve controls a multiple set of burners, a slightly different adjustment of the valve 52 is required in order to secure the action recited immediately above.

It will be seen that this invention provides a restricted supply bleed for each of the upper and lower compartments of the diaphragm casing, a restricted relief bleed and a restricted by pass passageway. This construction, therefore, provides a control for a main valve having both a snap on and a snap off action and also a floating action, and all of these results are accomplished by the use of a single diaphragm.

It will be seen that all of the above described functions are obtained by a very simple and easily produced mechanism, which is reliable in operation and which is cheap to manufacture.

Although this invention has been described in considerable detail, it is to be understood that such description is intended as illustrative rather than limiting, as the invention may be variously embodied and is to be interpreted as claimed.

I claim:

1. An automatic diaphragm valve comprising a casing, a diaphragm dividing said casing into an upper and a lower compartment, said upper compartment having a restricted relief bleed leading therefrom, a main valve operated from said diaphragm and having a body portion provided with a main inlet duct and a main outlet duct, said diaphragm valve having means providing restricted supply bleeds connecting said upper and lower compartments with one of the main ducts of said body portion, means biasing said valve towards closed position, said diaphragm valve having means forming a by pass means between said upper and lower compartments, and automatic regulator means for controlling said by pass means.

2. An automatic diaphragm valve comprising a casing, a diaphragm dividing said casing into an upper and a lower compartment, said upper compartment having a restricted relief bleed leading therefrom, a main valve including a body portion provided with an inlet duct and an outlet duct and having a movable valve member operatively coupled to said diaphragm and controlling the flow of fluid from the inlet to the outlet duct, means biasing said valve member towards closed position, means providing restricted supply bleeds connecting said upper and lower compartments with the inlet duct of said main valve, means providing a by pass passageway from said upper compartment to said lower compartment, and an automatic regulator means controlling communication between said upper and lower compartments through said by pass passageway, whereby said valve member may float between open and closed positions under the control of said regulator means.

3. An automatic diaphragm valve comprising a casing, a diaphragm dividing said casing into an upper and a lower compartment, said upper compartment having a restricted relief bleed leading therefrom, a main valve including a body portion provided with an inlet duct and an outlet duct and having a movable valve member operatively coupled to said diaphragm and controlling the flow of fluid from the inlet to the outlet duct, means biasing said valve member towards closed position, means providing restricted supply bleeds connecting said upper and lower compartments with the inlet duct of said main valve, means providing a by pass passageway from said upper compartment to said lower compartment, and an automatic regulator means controlling communication between said upper and lower compartments through said by pass passageway and gradually opening and closing said by pass passageway, whereby said valve member may float between open and closed positions under the control of said regulator means.

4. An automatic diaphragm valve device comprising a casing, a diaphragm dividing said casing into an upper and a lower compartment, said upper compartment having a relief bleed leading therefrom, manual means controlling said relief bleed, a main valve including a body portion having an inlet duct and an outlet duct and having a movable valve member operatively coupled to said diaphragm and controlling the flow of fluid from said inlet to said outlet ducts, means biasing said valve member towards closed position, said device having restricted supply bleeds connecting said upper and lower compartments with said inlet duct, means providing a by pass passageway from said upper compartment to said lower compartment, and an automatic regulator means controlling said by pass passageway, whereby said valve means may float between open and closed position, and whereby the closing of said relief bleed will cause said valve to close irrespective of any operation of said regulator means.

5. An automatic diaphragm valve device comprising a casing, a diaphragm dividing said casing into an upper and a lower compartment, said upper compartment having a relief bleed leading therefrom, manual means for opening said relief bleed, a main valve including a body portion having an inlet duct and an outlet duct and having a movable valve member operatively coupled to said diaphragm and controlling the flow of fluid from said inlet to said outlet ducts, means biasing said valve member towards closed position, said device having restricted supply bleeds connecting said upper and lower compartments with said inlet duct, means providing a by pass passageway from said upper compartment to said lower compartment, an automatic regulator means controlling said by pass passageway, whereby said valve means may float between open and closed position, and whereby the closing of said relief bleed will cause said valve to close irrespective of any operation of said regulator means, said manual means being biased towards closed position, and an electric relay for releasing said manual means.

6. An automatic diaphragm valve device comprising a casing, a diaphragm dividing said casing into an upper and a lower compartment, said upper compartment having a relief bleed leading therefrom, manual means opening said relief bleed, a main valve including a body portion having an inlet duct and an outlet duct and having a movable valve member operatively coupled to said diaphragm and controlling the flow of fluid from said inlet to said outlet ducts, means biasing said valve member towards closed position, said device having restricted supply bleeds connecting said upper and lower compartments with said inlet duct, means providing a by pass passageway from said upper compartment to said lower compartment, an automatic regulator means controlling said by pass passageway, whereby said valve means may float between open and closed position, and whereby the closing of said relief bleed will cause said valve to close irrespective of any operation of said regulator means, said manual means being biased towards closed position and latching in open position and manually releasable from latched position, and an electric relay for releasing said manual means.

7. An automatic diaphragm valve device comprising a casing, a diaphragm dividing said casing into an upper and a lower compartment, said upper compartment having a relief bleed leading therefrom, a relief bleed valve controlling said relief bleed, an electric relay controlling said relief bleed valve, a main valve including a body portion having an inlet duct and an outlet duct and having a movable member operatively coupled to said diaphragm and controlling the flow of fluid from said inlet to said outlet ducts, means biasing said valve member towards closed position, said device having restricted supply bleeds connecting said upper and lower compartments with said inlet duct, means providing a by pass passageway from said upper compartment to said lower compartment, and an automatic regulator means controlling said by pass passageway, whereby said valve may float between open and closed position when said relief bleed valve is in open position.

8. An automatic diaphragm valve device comprising a casing, a diaphragm dividing said casing into an upper and a lower compartment, said upper compartment having a relief bleed leading therefrom, a relief bleed valve controlling said relief bleed, an electric relay controlling said relief bleed valve, a main valve including a body portion having an inlet duct and an outlet duct and having a movable member operatively coupled to said diaphragm and controlling the flow of fluid from said inlet to said outlet ducts, means biasing said valve member towards closed position, said device having restricted supply bleeds connecting said upper and lower compartments with said inlet duct, means providing a by pass passageway from said upper compartment to said lower compartment, and an automatic regulator means controlling said by pass passageway, said electric relay being biased towards relief valve closed position, whereby said valve means may float between open and closed position when said relay is energized and whereby said valve means closes when said electric relay is deenergized.

9. An automatic diaphragm valve comprising a casing, a diaphragm dividing said casing into an upper and a lower compartment, said upper compartment having a restricted relief bleed leading therefrom, a main valve operated from said diaphragm and having a body portion provided with a main inlet duct and a main outlet duct, said diaphragm valve having means providing restricted supply bleeds connecting said upper and lower compartments with one of the main ducts of said body portion, means biasing said valve towards closed position, said diaphragm valve having means forming a restricted by pass means between said upper and lower compartments, and automatic regulator means for controlling said restricted by pass means.

10. An automatic diaphragm valve comprising a casing, a diaphragm dividing said casing into an upper and a lower compartment, said upper compartment having a restricted relief bleed leading therefrom, a main valve including a body portion provided with an inlet duct and an outlet duct and having a movable valve member operatively coupled to said diaphragm and controlling the flow of fluid from the inlet to the outlet duct, means biasing said valve member towards closed position, means providing restricted supply bleeds connecting said upper and lower compartments with the inlet duct of said main valve, means providing a restricted by pass passageway from said upper compartment to said lower compartment, and an automatic regulator means controlling communication between said upper and lower compartments through said restricted by pass passageway, whereby said valve member may float between open and closed positions under the control of said regulator means.

11. An automatic single diaphragm valve comprising a casing provided with a diaphragm dividing said casing into two compartments, a main valve biased towards closed position operated from said diaphragm, quick action means for causing quick closing and opening of said valve by varying the pressure acting on said diaphragm, and automatic restricted by pass means for by passing pressure from one compartment to the other compartment for causing a floating action of said valve.

12. An automatic single diaphragm valve comprising a casing provided with a diaphragm dividing said casing into two compartments, a main valve biased towards closed position operated from said diaphragm, quick action means for causing quick closing and opening of said valve by varying the pressure acting on said diaphragm, automatic restricted by pass means for by passing pressure from one compartment to the other compartment for causing a floating action of said valve, and a minimum adjustment means for controlling the restriction in said by pass means.

13. An automatic single diaphragm valve comprising a casing provided with a diaphragm dividing said casing into two compartments, a main valve biased towards closed position operated from said diaphragm, quick action means for causing quick closing and opening of said valve by varying the pressure acting on said diaphragm, automatic restricted by-pass means for by-passing pressure from one compartment to the other compartment for causing a floating action of said valve, and a minimum adjustment means for controlling the restriction of said by-pass means.

FRANK A. GAUGER.